US00RE41027E

(19) United States
(12) Reissued Patent
Orcutt et al.

(10) Patent Number: US RE41,027 E
(45) Date of Reissued Patent: Dec. 1, 2009

(54) SYSTEMS AND METHODS TO COMPENSATE A FREQUENCY

(76) Inventors: Edward K. Orcutt, 8141 E. Whitehorn Cir., Scottsdale, AZ (US) 85262; Randy L. Turcotte, 1329 E. LaVieve La., Tempe, AZ (US) 85284

(21) Appl. No.: 11/123,254

(22) Filed: May 6, 2005

Related U.S. Patent Documents

Reissue of:
(64) Patent No.: 6,560,440
Issued: May 6, 2003
Appl. No.: 09/685,497
Filed: Oct. 10, 2000

(51) Int. Cl.
*H04B 7/185* (2006.01)
*H04B 17/00* (2006.01)

(52) U.S. Cl. ..... 455/13.1; 455/501; 455/67.13
(58) Field of Classification Search ..... 455/13.1, 455/501, 67.13, 427, 431, 12.1, 63.1, 70, 455/71, 295, 296, 67.11; 342/99, 100, 402, 342/405
See application file for complete search history.

(56) References Cited

U.S. PATENT DOCUMENTS

| | | | | | |
|---|---|---|---|---|---|
| 4,074,201 | A | | 2/1978 | Lennon | |
| 5,222,252 | A | | 6/1993 | Kasser | |
| 5,289,194 | A | | 2/1994 | Schlosser | |
| 5,343,496 | A | | 8/1994 | Honig et al. | |
| 5,432,521 | A | * | 7/1995 | Siwiak et al. | 342/352 |
| 5,471,657 | A | | 11/1995 | Gharpuray et al. | |
| 5,493,710 | A | | 2/1996 | Takahara et al. | |
| 5,524,281 | A | | 6/1996 | Bradley et al. | |
| 5,596,570 | A | | 1/1997 | Soliman | |
| 5,694,421 | A | | 12/1997 | Park | |
| 5,697,056 | A | | 12/1997 | Tayloe | |
| 5,703,595 | A | * | 12/1997 | Tayloe et al. | 342/175 |
| 5,754,537 | A | | 5/1998 | Jamal | |
| 5,758,271 | A | | 5/1998 | Rich et al. | |
| 5,778,310 | A | | 7/1998 | Tong et al. | |
| 5,874,913 | A | * | 2/1999 | Blanchard et al. | 342/352 |
| 5,881,367 | A | | 3/1999 | Calot et al. | |
| 5,926,767 | A | | 7/1999 | Olds et al. | |
| 5,983,080 | A | | 11/1999 | Gerszberg et al. | |
| 5,987,320 | A | | 11/1999 | Bobick | |
| 5,999,797 | A | | 12/1999 | Zancho et al. | |
| 6,023,615 | A | | 2/2000 | Bruckert et al. | |
| 6,034,952 | A | | 3/2000 | Dohi et al. | |
| 6,356,740 | B1 | * | 3/2002 | Malcolm et al. | 455/71 |

OTHER PUBLICATIONS

E–mail regarding search, from admin@patenttrakker.com to Michael Messinger, sent Mar. 27, 2006, 10:42 AM, 5 pages.

* cited by examiner

*Primary Examiner*—Nguyen Vo
(74) *Attorney, Agent, or Firm*—Sterne, Kessler, Goldstein & Fox, P.L.L.C.

(57) ABSTRACT

[A satellite vehicle compensation system (100) predicts the motion of two satellite vehicles and enhances the predictions with real-time updates of one or both of the vehicles. Using feedback loops (132, 134), the differences between the prediction and the actual motions are looped back to improve the accuracy of the motion predictor.] *A communications system includes a first communications node and a second communications node. A transmission frequency and/or a receiving frequency is compensated based on a predicted relative motion between the first and second communications nodes. The predicted relative motion is based on a first signal that is representative of a predicted motion of the first communications node and a second signal that is representative of a predicted motion of the second communications node. Real-time information may be used to minimize an error between predicted and measured motions of the first and/or second communications node.*

22 Claims, 1 Drawing Sheet

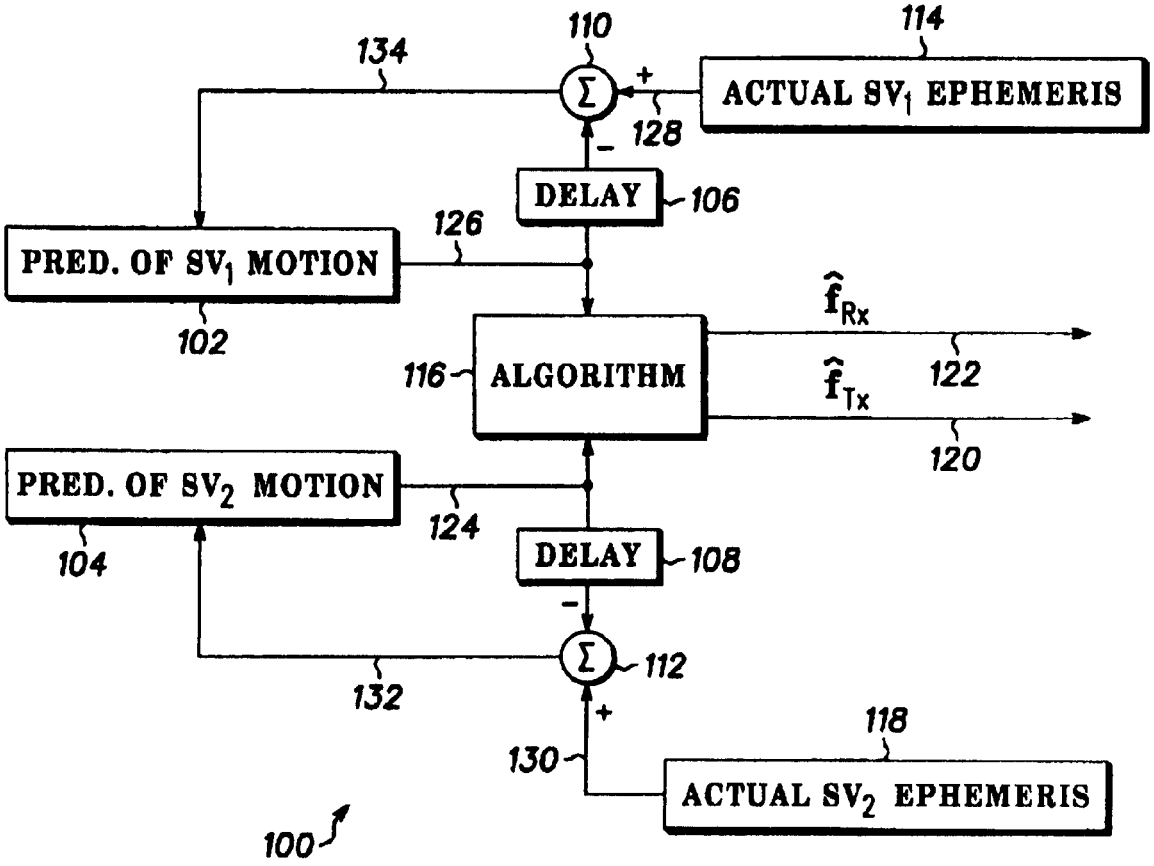
110
114
134
ACTUAL SV1 EPHEMERIS
+
128
−
DELAY
106
126
PRED. OF SV1 MOTION
102
f̂Rx
116
ALGORITHM
f̂Tx
122
120
PRED. OF SV2 MOTION
124
104
DELAY
108
−
112
132
+
118
130
ACTUAL SV2 EPHEMERIS
100

SYSTEMS AND METHODS TO COMPENSATE A FREQUENCY

Matter enclosed in heavy brackets [ ] appears in the original patent but forms no part of this reissue specification; matter printed in italics indicates the additions made by reissue.

TECHNICAL FIELD

The present invention relates to satellite communications systems, which include communication between two moving satellites, between one moving satellite and a ground-based station (moving or stationary), between a spaced-based vehicle and an airborne (but not space-based) vehicle, or any combination of the above.

BACKGROUND ART AND TECHNICAL PROBLEMS

In a satellite communications system, one satellite vehicle ($SV_1$) transmits and receives data from another satellite vehicle ($SV_2$). Even though one or both vehicles may be moving, if the relative distance between the two vehicles is constant, the carrier frequency on which data is transmitted from one vehicle to another is the same carrier frequency received by the receiving vehicle. In the more typical case, the relative motion between the two vehicles in communication is not constant, and Doppler effects come into play. As long as the relative motion between the transmitter and receiver is within the design constraints of those devices, classical techniques, such as those described in Spiker, James J., Digital Communications by Satellite, Prentice-Hall, Ch. 12, 1995, may be employed to compensate for the carrier frequency shift due to the relative motion between the two vehicles. For example, a frequency-locked loop or a phase-locked loop technique may be employed to track Doppler frequency shifts and maintain communication between the two vehicles. However, these classical tracking techniques often involve broadening the bandwidth of the frequency tracking device and/or the bandwidth of the receiver's noise limiting front-end filter, which tends to reduce the signal-to-noise ratio of the received signal. When the relative motion between the transmitter and the receiver is unacceptably high, the signal-to-noise ratio can become unacceptably low, rendering known compensation techniques insufficient.

A technique is thus needed which allows satellite vehicles to communicate with one another when the relative motion and the change in relative motion between two vehicles is high, while maintaining an acceptable signal-to-noise ratio of the received signal.

BRIEF DESCRIPTION OF THE DRAWING

The subject invention will hereinafter be described in conjunction with the appended drawing FIGURE, wherein the referenced numerals in the drawing FIGURE correspond to the associated descriptions provided below, and the drawing FIGURE is a schematic block diagram of a preferred embodiment of a frequency compensation system in accordance with the present invention.

DETAILED DESCRIPTION OF THE DRAWING

In a preferred embodiment of the present invention, a first satellite vehicle ($SV_1$) desires to transmit data to a second satellite vehicle ($SV_2$), wherein the second satellite vehicle ($SV_2$) may be a member of a constellation of satellites having known communication protocols. The first satellite vehicle $SV_1$, which in this example is not a member of the constellation, may conveniently communicate with the second satellite vehicle $SV_2$ as long as satellite $SV_1$ comports with the protocols of the constellation to which satellite $SV_2$ belongs. When the relative motion between $SV_1$ and $SV_2$ is sufficiently low, classical compensation techniques may be employed to account for the Dopplar shift in the transmitted frequency as a result of the relative motion between the two vehicles. Typically, the receiving satellite (in this example, $SV_2$) would monitor a frequency range within which the received signal is expected to fall. However, when the Doppler effects render the use of conventional tracking techniques inadequate, the following compensation system may be employed.

Referring now to the drawing FIGURE, a compensation system 100 which, in a preferred embodiment, resides only on $SV_1$, suitably comprises an $SV_1$ motion predictor 102, an $SV_2$ motion predictor 104, and a processor 116 for computing a predictive algorithm. More particularly, $SV_1$ motion predictor 102 suitably comprises a static or dynamic flight plan associated with satellite vehicle $SV_1$, which may include information relating to speed, trajectory, acceleration, and other position and motion information; $SV_2$ motion predictor 104 suitably includes similar functionality for second satellite vehicle $SV_2$. An output 126 of the $SV_1$ motion predictor 102, and an output 124 of the $SV_2$ motion predictor 104, are suitably supplied to processor 116, whereupon processor 116 outputs a predicted transmission carrier frequency signal 120, and a predicted receiver carrier frequency 122 based upon the predicted relative motion between the two vehicles. In the context of the illustrated embodiment, predicted transmission carrier frequency signal 120 represents the extent to which the transmitter on $SV_1$ should compensate its frequency based on the predicted relative motion between the two vehicles; similarly, predicted receiver carrier signal 122 represents the extent to which the receiver on $SV_1$ should compensate for the predicted relative motion between the two vehicles by adjusting to the frequency at which the received signal is expected to arrive at the receiver.

If the information regarding the motion of the two satellite vehicles (contained in respective predictors 102 and 104), as well as the algorithm contained within processor 116 were perfect, vehicles moving relative to one another could always communicate with a very high signal-to-noise ratio. In reality, however, the predictive models of satellite vehicle motion, as well as the algorithms used to calculate frequency compensation, are imperfect and, over time, degradation in frequency compensation will result. Thus, the foregoing compensation model may be enhanced, if desired, by applying, where practicable, real-time updates to the compensation model including ephemeris data of one or both space vehicles.

With continued reference to the drawing FIGURE, a measured $SV_1$ ephemeris data block 114 supplies real-time updates to $SV_1$ motion predictor 102; similarly, a measured $SV_2$ ephemeris data block 118 is configured to supply real-time updates to $SV_2$ motion predictor 104. More particularly, an output 128 of block 114, which comprises real-time information relating to the actual position and/or motion of satellite vehicle $SV_1$, is supplied to a summing node 110. Output 126 of $SV_1$ motion predictor 102 is suitably delayed through a delay element 106 and supplied to node 110, whereupon summing node 110 computes the difference between the predicted motion of first satellite vehicle $SV_1$ and the measured motion of first satellite vehicle $SV_1$. The difference between these two values, represented by a signal 134, is then supplied to $SV_1$ motion predictor 102. Feedback signal 134 drives the error between the measured motion of $SV_1$ (represented by output signal 128) and the predicted motion of $SV_1$ (represented by output signal 126) to a minimum.

In a similar fashion, an output 130 of block 118, which comprises real-time information relating to the actual position and/or motion of satellite vehicle $SV_2$, is supplied to a summing node 112. Output 124 of $SV_2$ motion predictor 104 is suitably delayed through a delay element 108 and supplied to node 112, whereupon summing node 112 computes the difference between the predicted motion of second satellite vehicle $SV_2$ and the measured motion of second satellite vehicle $SV_2$, the difference between these values, represented by a signal 132, is then supplied to $SV_2$ motion predictor 104. Feedback signal 132 drives the error between the measured motion of $SV_2$ (represented by output signal 130) and the predicted motion of $SV_2$ (represented by output signal 124) to a minimum.

By employing real-time position and/or motion data of one or both of the vehicles involved in a communication session to the compensation model as illustrated in the drawing FIGURE, the frequency compensation model can be significantly improved, thereby allowing computation of frequency compensation information, even in the presence of high relative motion dynamics between the two vehicles.

Although the present invention has been described with reference to the drawing FIGURE, those skilled in the art will appreciate that the scope of the invention is not limited to the specific forms shown in the FIGURE. Various modifications, substitutions, and enhancements may be made to the descriptions set forth herein, without departing from the spirit and scope of the invention which is set forth in the appended claim.

What is claimed is:

1. In a satellite communications system involving a satellite vehicle $SV_1$ and a second satellite vehicle $SV_2$ moving relative to one another, a method for compensating at least one of a transmission frequency associated with $SV_1$ and a received frequency associated with $SV_2$, the method comprising the steps of:

predicting a motion of satellite vehicle $SV_1$ and generating a first output signal representative of the predicted motion of satellite vehicle $SV_1$;

predicting a motion of satellite vehicle $SV_2$ and generating a second output signal representative of the predicted motion of satellite vehicle $SV_2$;

supplying said first output signal and said second output signal to a processor and computing in said processor at least one of a compensating transmission frequency and a compensated receiving frequency based on said first output signal and said second output signal;

determining an actual motion of $SV_1$ and generating a third output signal representative of the actual motion of $SV_1$;

determining an actual motion of $SV_2$ and generating a fourth output signal representative of the actual motion of $SV_2$;

supplying said first output signal and said third output signal to a first summing junction and generating a first feedback signal representative of the difference between said first output signal and said third output signal;

supplying said second output signal and said fourth output signal to a second summing junction and generating a second feedback signal representative of the difference between said second output signal and said fourth output signal;

using said first feedback signal to improve the accuracy of said first output signal; and using said second feedback signal to improve the accuracy of said second output signal.

*2. A method of compensating a frequency associated with a first communications node or a second communications node in a communications system, comprising:*

*generating a first signal representing a predicted motion of said first communications node;*

*generating a second signal representing a predicted motion of said second communications node;*

*computing at least one of a compensated transmission frequency or a compensated receiving frequency based on a predicted relative motion between said first and second communications nodes, wherein said predicted relative motion is based on said first and second signals;*

*generating a third signal representing an actual motion of said first communications node;*

*generating a feedback signal representing a difference between said first signal and said third signal; and*

*applying said feedback signal to improve accuracy of said first signal.*

*3. The method of claim 2, wherein said generating a first signal comprises:*

*utilizing a static or dynamic flight plan associated with said first communications node to generate said first signal.*

*4. The method of claim 3, wherein said static or dynamic flight plan includes information relating to acceleration.*

*5. The method of claim 3, wherein said static or dynamic flight plan includes information relating to trajectory.*

*6. The method of claim 3, wherein said static or dynamic flight plan includes information relating to speed.*

*7. The method of claim 3, wherein said static or dynamic flight plan includes information relating to position.*

*8. The method of claim 2, wherein said generating a second signal comprises:*

*receiving a real-time update including ephemeris data associated with at least one of said first communications node or said second communications node to generate said second signal.*

*9. A communications system that compensates a frequency associated with a first communications node or a second communications node, comprising:*

*a motion predictor configured to provide a first signal representing a predicted motion of said communications node;*

*a data block configured to provide a second signal representing an actual motion of said first communications node;*

*an element configured to adjust said first signal based on a difference between said first and second signals; and*

*a processor configured to compute at least one of a compensated transmission frequency or a compensated receiving frequency based on a predicted relative motion between said first and second communications nodes;*

*wherein said predicted relative motion is based on said first signal and a third signal that is representative of a predicted motion of said second communications node.*

*10. The communications system of claim 9, wherein at least one of said first or second communications nodes is stationary.*

*11. The communications system of claim 9, wherein at least one of said first or second communications nodes is mobile.*

*12. The communications system of claim 9, wherein at least one of said first or second communications nodes is airborne.*

*13. The communications system of claim 9, wherein at least one of said first or second communications nodes is space-based.*

*14. The communications system of claim 9, wherein said data block is configured to provide real-time updates that include ephemeris data associated with at least one of said first or second communications nodes.*

*15. A communications node, comprising:*

*a motion predictor configured to obtain a first signal representing a predicted motion of said node;*

*a data block configured to obtain a second signal representing an actual motion of said node;*

*an element configured to adjust said first signal based on a difference between said first and second signals; and*

*a processor configured to compute at least one of a compensated transmission frequency or a compensated receiving frequency based on a predicted relative motion between said node and a second communications node;*

*wherein said predicted relative motion is based on said first signal and a third signal that is representative of a predicted motion of said second communications node.*

*16. A communications system, comprising:*

*means for predicting a motion of a first communications node to generate a first signal representing the predicted motion of said first communications node;*

*means for predicting a motion of a second communications node to generate a second signal representing the predicted motion of said second communications node;*

*a processor to compute at least one of a compensated transmission frequency and a compensated receiving frequency based on said first signal and said second signal;*

*means for determining an actual motion of said first communications node to generate a third signal representing the actual motion of said first communications node;*

*means for determining an actual motion of said second communications node to generate a fourth signal representing the actual motion of said second communications node;*

*means for generating a first feedback signal representing a difference between said first signal and said third signal to improve accuracy of said first signal; and*

*means for generating a second feedback signal representing a difference between said second signal and said fourth signal to improve accuracy of said second signal.*

*17. A communications system, comprising:*

*a first communications node, including*

*a first motion predictor to generate a first signal representative of a predicted motion of said first communications node,*

*a first data block to generate a second signal representative of an actual motion of said first communications node, and*

*a first element that generates a first feedback signal representative of a difference between said first signal and said second signal to improve accuracy of said first signal;*

*a second communications node, including*

*a second motion predictor to generate a third signal representative of a predicted motion of said second communications node,*

*a second data block to generate a fourth signal representative of an actual motion of said second communications node, and*

*a second element that generates a second feedback signal representative of a difference between said third signal and said fourth signal to improve accuracy of said third signal; and*

*a processor to compute at least one of a compensated transmission frequency or a compensated receiving frequency based on said first signal and said third signal.*

*18. The communications system of claim 17, wherein at least one of said first communications node or said second communications node is a moving satellite.*

*19. The communications system of claim 17, wherein at least one of said first communications node or said second communications node is a ground-based station.*

*20. The communications system of claim 17, wherein at least one of said first communications node or said second communications node is a space-based vehicle.*

*21. The communications system of claim 17, wherein at least one of said first communications node or said second communications node is an airborne vehicle.*

*22. The communications system of claim 17, wherein said first communications node or said second communications node includes said processor.*

* * * * *